(12) United States Patent
Guo et al.

(10) Patent No.: US 10,405,729 B2
(45) Date of Patent: Sep. 10, 2019

(54) HEAT PUMP AND DISHWASHER COMPRISING THE SAME

(71) Applicant: FOSHAN SHUNDE MIDEA WASHING APPLIANCES MFG. CO., LTD., Foshan (CN)

(72) Inventors: Chuanjiang Guo, Foshan (CN); Lianjing Niu, Foshan (CN); Feng Gao, Foshan (CN)

(73) Assignee: FOSHAN SHUNDE MIDEA WASHING APPLIANCES MFG. CO., LTD., Foshan (CN)

( * ) Notice: Subject to any disclaimer, the term of this patent is extended or adjusted under 35 U.S.C. 154(b) by 9 days.

(21) Appl. No.: 15/326,333

(22) PCT Filed: Jan. 12, 2015

(86) PCT No.: PCT/CN2015/070555
§ 371 (c)(1),
(2) Date: Jan. 13, 2017

(87) PCT Pub. No.: WO2016/008286
PCT Pub. Date: Jan. 21, 2016

(65) Prior Publication Data
US 2017/0209019 A1    Jul. 27, 2017

(30) Foreign Application Priority Data

Jul. 15, 2014 (CN) .......................... 2014 1 0336699

(51) Int. Cl.
*A47L 15/42* (2006.01)
*F04D 29/44* (2006.01)
(Continued)

(52) U.S. Cl.
CPC ........ *A47L 15/4285* (2013.01); *F04D 29/445* (2013.01); *F04D 29/588* (2013.01);
(Continued)

(58) Field of Classification Search
CPC . A47L 15/4285; F04D 29/586; F04D 29/588; F04D 29/445; D06F 39/40
(Continued)

(56) References Cited

U.S. PATENT DOCUMENTS 4,721,435 A * 1/1988 Kuah .................... F04D 29/669
    415/143
7,942,646 B2 * 5/2011 Zhou ..................... F04D 25/082
    310/156.11
(Continued)

FOREIGN PATENT DOCUMENTS

CN    102748329 A    10/2012
DE    10142525 A1    3/2003
(Continued)

OTHER PUBLICATIONS

Machine translation of DE-10142525-A1, dated Mar. 2003. (Year: 2003).*
(Continued)

*Primary Examiner* — Michael E Barr
*Assistant Examiner* — Kevin G Lee
(74) *Attorney, Agent, or Firm* — Scully, Scott, Murphy & Presser, P.C.

(57) ABSTRACT

A heat pump for a dishwasher includes an upper shell (10) defining an upper chamber (100) therein, a heating pipe (20) disposed in the upper chamber (100), a lower shell (30) defining a lower chamber (300) therein and detachably connected with the upper shell (10), an impeller (40) disposed in the lower chamber (300), and a flowing guide (50) disposed in the upper chamber (100) and adjacent to the heating pipe (20). The upper shell (10) includes an inlet (101) disposed in an upper end surface thereof and communicated with the upper chamber (100). A dishwasher including the heat pump is also provided. With a guiding effect of
(Continued)

the flowing guide (50), the stream may contact with the heating pipe (20) and perform a complete heat exchange with the heating pipe (20), thus enhancing the heat exchanging efficiency of the heating pipe (20) and totally improving the heating efficiency of the heat pump.

9 Claims, 2 Drawing Sheets

(51) Int. Cl.
    *F04D 29/58*    (2006.01)
    *F04D 29/42*    (2006.01)
    *F04D 29/22*    (2006.01)

(52) U.S. Cl.
    CPC .............. *A47L 15/42* (2013.01); *F04D 29/22* (2013.01); *F04D 29/4273* (2013.01)

(58) Field of Classification Search
    USPC ........................................................ 134/105
    See application file for complete search history.

(56) References Cited

U.S. PATENT DOCUMENTS

2005/0201878 A1*   9/2005   Kraffzik .............. A47L 15/4225
                                                          417/423.14
2012/0224961 A1     9/2012   Weber et al.

FOREIGN PATENT DOCUMENTS

EP           1787567 A2 *   5/2007   ......... A47L 15/4225
WO    WO-2014030248 A1 *   2/2014   ......... F04D 29/4213

OTHER PUBLICATIONS

Chinese Patent Application No. 201410336699.9 First Office Action dated Apr. 5, 2017, 6 pages.
Chinese Patent Application No. 201410336699.9 English translation of First Office Action dated Apr. 5, 2017, 5 pages.
PCT/CN2015/070555 International Search Report & Written Opinion dated Mar. 13, 2015, 12 pages.

* cited by examiner

HEAT PUMP AND DISHWASHER COMPRISING THE SAME

CROSS-REFERENCE TO RELATED APPLICATIONS

This application claims priority to and benefits of Chinese Patent Application No. 201410336699.9, filed with the State Intellectual Property Office of P. R. China on Jul. 15, 2014, the entire content of the above-identified application is incorporated herein by reference.

FIELD

Embodiments of the present disclosure relate to household appliances, and more particularly to a heat pump and a dishwasher including the heat pump.

BACKGROUND

Energy consumption is an importance index for a dishwasher, especially the heating energy consumption. A conventional heat pump may meet certain heating requirements during a heating process, however, has relatively low heating efficiency. The energy consumption of the conventional heat pump may be extremely large when being heated to a predetermined temperature, and therefore the total energy consumption of the dishwasher is relatively large.

SUMMARY

Embodiments of the present disclosure seek to solve at least one of the problems existing in the prior art.

Embodiments of an aspect of the present disclosure provide a heat pump for a dishwasher. The heat pump for a dishwasher according to embodiments of the present disclosure includes: an upper shell which defines an upper chamber therein and includes an inlet disposed in an upper surface of the upper chamber and communicated with the upper chamber; a heating pipe disposed in the upper chamber; a lower shell defining a lower chamber therein and detachably connected with the upper shell; an impeller disposed in the lower chamber; and a flowing guide disposed in the upper chamber and adjacent to the heating pipe.

With the heat pump for a dishwasher according to embodiments of the present disclosure, the flowing guide is disposed in the upper chamber and adjacent to the heating pipe. With a guiding effect of the flowing guide, flows may contact with the heating pipe and perform a complete heat exchange with the heating pipe, thus enhancing the heat exchanging efficiency of the heating pipe and improving the total heating efficiency of the heat pump.

In some embodiments, the heating pipe includes an arc segment substantially horizontally disposed in the upper chamber, and the flowing guide is surrounded by the arc segment and opposed to the inlet in an up-down direction.

In some embodiments, the flowing guide includes a guiding plate and a plurality of fixing pillars disposed at an edge of the guiding plate and connected with an inner wall of the upper shell.

In some embodiments, the guiding plate has an umbrella shape.

In some embodiments, the fixing pillars are uniformly spaced apart from each other along a circumferential direction of the guiding plate.

In some embodiments, there are provided with three fixing pillars.

In some embodiments, the fixing pillars are welded with the guiding plate, and the fixing pillars are welded with the upper shell.

Embodiments of another aspect of the present disclosure provide a dishwasher. The dishwasher according to embodiments of the present disclosure includes the heat pump described above.

With the dishwasher according to embodiments of the present disclosure, a total energy consumption of the dishwasher may be reduced.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
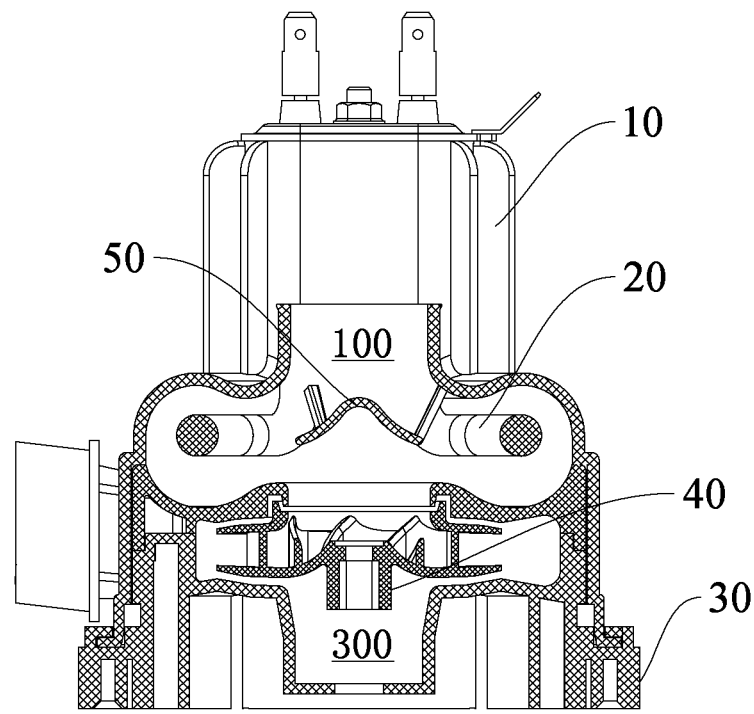
FIG. 1 is a schematic view of a heat pump for a dishwasher according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

A heat pump for a dishwasher according to embodiments of the present disclosure will be described below in detail with reference to the drawings.

Figure 2:
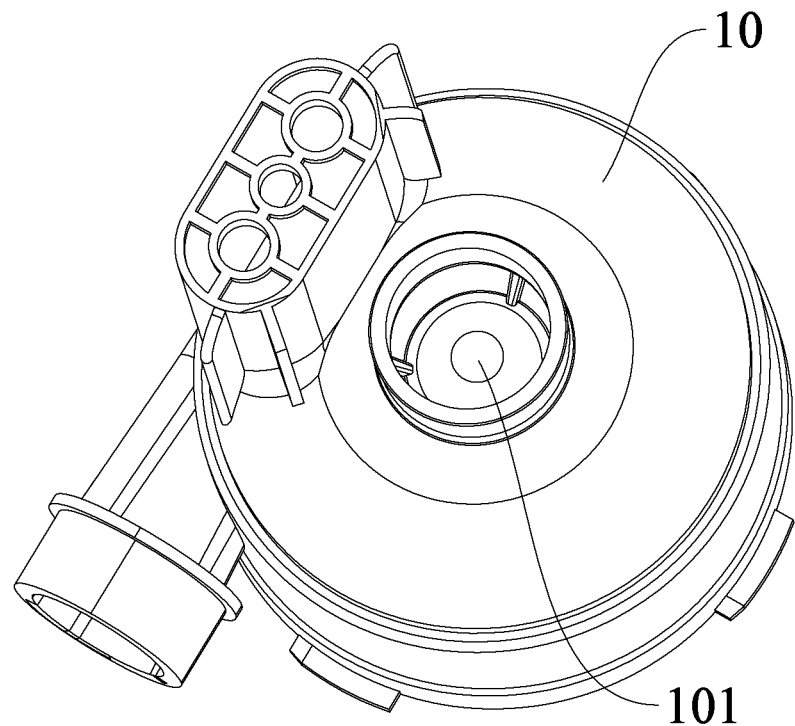
FIG. 2 is a schematic view of a heat pump for a dishwasher according to another embodiment of the present disclosure.

As shown in FIGS. 1-2, a heat pump for a dishwasher according to an embodiment of the present disclosure includes an upper shell 10, a heating pipe 20, a lower shell 30, an impeller 40 and a flowing guide 50.

In some embodiments, the upper shell 10 defines an upper chamber 100 in an interior thereof. An inlet 101 is formed in the upper end surface of the upper shell 10 and communicated with the upper chamber 100. The heating pipe 20 is disposed in the upper chamber 10. The lower shell 30 defines a lower chamber 300 in an interior therein, and the lower shell 30 is detachably connected with the upper shell 10. The impeller 4 is disposed in the lower chamber 30. The flowing guide 50 is disposed in the upper chamber 100 and adjacent to the heating pipe 20.

In some embodiments, the heating pipe 20 includes an arc segment. The arc segment is substantially horizontally disposed in the upper chamber 100. The flowing guide 50 is disposed in the arc segment and opposed to the inlet 101 in an up-down direction. In other words, the flowing guide 50 is surrounded or encircled by the arc segment.

With the heat pump according to embodiments of the present disclosure, the flowing guide is disposed in the upper chamber and adjacent to the heating pipe. With a guiding effect of the flowing guide, the stream may contact with the heating pipe and perform a complete heat exchange with the heating pipe, thus enhancing the heat exchanging efficiency of the heating pipe and improving the total heating efficiency of the heat pump.

In some embodiments of the present disclosure, the flowing guide 50 includes a guiding plate 501 and a plurality of fixing pillars 502 disposed at an edge of the guiding plate 501. The fixing pillars 502 are connected with an inner wall of the upper shell 10. For example, the fixing pillars 502 may be connected with the guiding plate 501 via welding, and the fixing pillars 502 may be connected with the upper shell 10 via welding.

Figure 3:
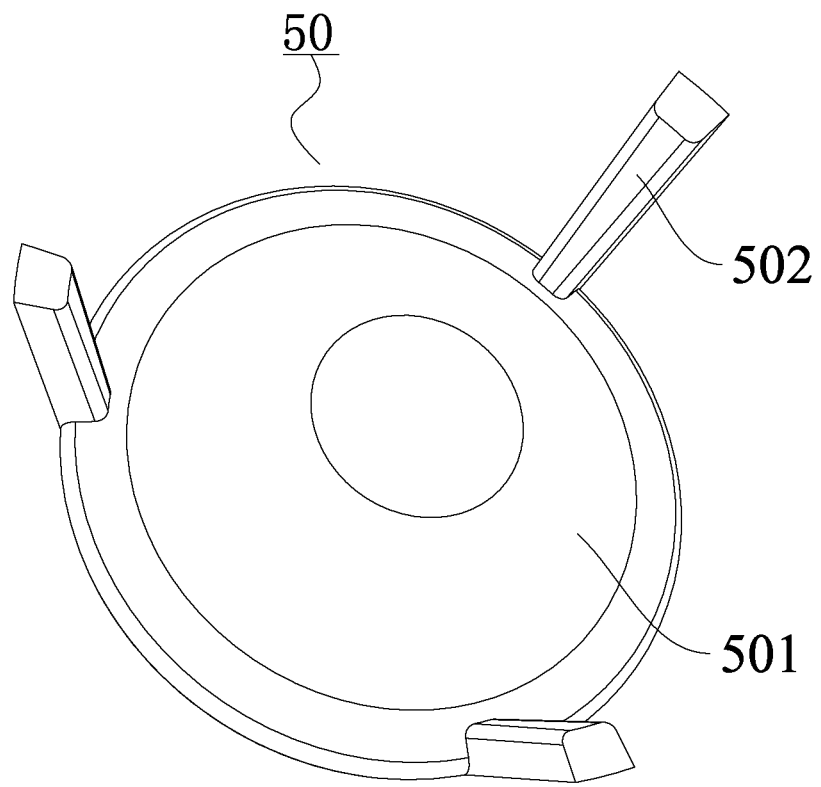
FIG. 3 is a schematic view of a flowing guide of a heat pump for a dishwasher according to an embodiment of the present disclosure.
Figure 4:
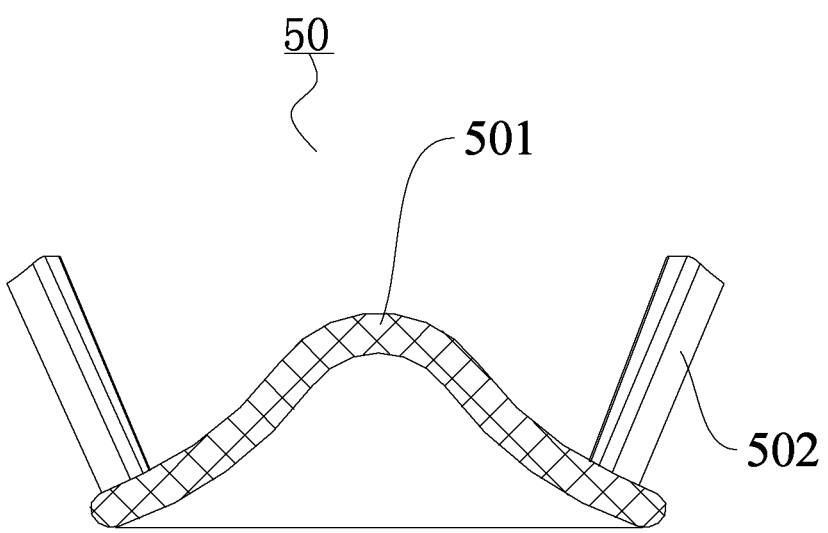
FIG. 4 is a schematic view of a flowing guide of a heat pump for a dishwasher according to another embodiment of the present disclosure.

In some embodiments of the present disclosure, the guiding plate 501 has an umbrella shape. As shown in FIGS. 3-4, the guiding plate 501 has a shape similar to an opened umbrella. As shown in FIG. 4, in some embodiments, a cross-section of the guiding plate 501 is similar to a roof. Under the guiding effect of the guiding plate 501, water from the inlet may flow to the heating pipe, especially the arc segment of the heating pipe, thus increasing the contact between the water and the heating pipe.

In some embodiments of the present disclosure, the fixing pillars 502 are uniformed spaced apart with each other along a circumferential direction of the guiding plate 501. In some embodiments, three fixing pillars 502 are provided. In some embodiments, an angle between two adjacent fixing pillars 502 of the three fixing pillars 502 is 120 degrees.

According to some embodiments of the present disclosure, after a flow flows across the flowing guide, under the guiding effect of the flowing guide, a part of the flow may flow above the heating pipe, across the outer wall of the heating pipe, and flow into the impeller inlet along a passage in the upper chamber. The other part of the flow may flow from the edge of the flowing guide to the inner side of the heating pipe, and then flow into the impeller inlet. Therefore, the heat exchanging efficiency of the heating pipe may be enhanced, and the total heating efficiency of the heat pump may be improved. With the heat pump for a dishwasher according to embodiments of the present disclosure, requirements for efficient heating during the heating process may be satisfied, and the total energy consumption of the heat pump may be reduced.

Embodiments of another aspect of the present disclosure provide a dishwasher. The dishwasher according to embodiments of the present disclosure includes the heat pump described above.

With the dishwasher according to embodiments of the present disclosure, a total energy consumption of the dishwasher may be reduced.

In the specification, it should be understood that, the terms such as "central", "longitudinal", "lateral", "width", "thickness", "above", "below", "front", "rear", "right", "left", "vertical", "horizontal", "top", "bottom", "inner", "outer", "clockwise", "counter-clockwise" should be construed to refer to the orientation as then described or as shown in the drawings. These terms are merely for convenience and concision of description and do not alone indicate or imply that the device or element referred to must have a particular orientation. Thus, it cannot be understood to limit the present disclosure.

In addition, terms such as "first" and "second" are used herein for purposes of description and are not intended to indicate or imply relative importance or significance or impliedly indicate quantity of the technical feature referred to. Thus, the feature defined with "first" and "second" may comprise one or more this feature. In the description of the present disclosure, "a plurality of" means two or more than two this features, unless specified otherwise.

In the present invention, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present invention, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments can not be construed to limit the present disclosure, and changes, alternatives, and modifications can be made in the embodiments without departing from spirit, principles and scope of the present disclosure.

What is claimed is:

1. A heat pump for a dishwasher, comprising:
an upper shell which defines an upper chamber therein and comprises an inlet disposed in an upper end surface of the upper chamber and communicated with the upper chamber;
a heating pipe disposed in the upper chamber;
a lower shell defining a lower chamber therein and detachably connected with the upper shell;
an impeller disposed in the lower chamber; and a flowing guide disposed in the upper chamber and adjacent to the heating pipe, wherein the flowing guide comprises a guiding plate and a plurality of fixing pillars disposed at an edge of the guiding plate and connected with an upper wall of the upper chamber at the inlet, the guiding plate is configured as a cone-like structure, and the cone-like structure is curved at an apex thereof, the heating pipe comprises an arc segment substantially horizontally disposed in the upper chamber, and the flowing guide is disposed in the arc segment and surrounded by the arc segment and opposed to the inlet in an up-down direction, such that a fluid can flow from the guiding plate of the flowing guide to a top surface and a side surface of the heating pipe.

2. The heat pump according to claim 1, wherein the fixing pillars are uniformly spaced apart from each other along a circumferential direction of the guiding plate.

3. The heat pump according to claim 2, wherein there are provided with three fixing pillars.

4. The heat pump according to claim 1, wherein the fixing pillars are welded with the guiding plate, and the fixing pillars are welded with the upper shell.

5. The heat pump according to claim 1, wherein the guiding plate is inflexed midway from the apex of the guiding plate to the edge of the guiding plate.

6. A dishwasher comprising a heat pump, the heat pump comprising:

an upper shell which defines an upper chamber therein and comprises an inlet disposed in an upper end surface of the upper chamber and communicated with the upper chamber;

a heating pipe disposed in the upper chamber;

a lower shell defining a lower chamber therein and detachably connected with the upper shell;

an impeller disposed in the lower chamber; and a flowing guide disposed in the upper chamber and adjacent to the heating pipe, wherein the flowing guide comprises a guiding plate and a plurality of fixing pillars disposed at an edge of the guiding plate and connected with an upper wall of the upper chamber at the inlet, the guiding plate is configured as a cone-like structure, and the cone-like structure is curved at an apex thereof, the heating pipe comprises an arc segment substantially horizontally disposed in the upper chamber, and the flowing guide is disposed in the arc segment and surrounded by the arc segment and opposed to the inlet in an up-down direction, such that a fluid can flow from the guiding plate of the flowing guide to a top surface and a side surface of the heating pipe.

7. The dishwasher according to claim 6, wherein the fixing pillars are uniformly spaced apart from each other along a circumferential direction of the guiding plate.

8. The dishwasher according to claim 7, wherein there are provided with three fixing pillars.

9. The dishwasher according to claim 6, wherein the fixing pillars are welded with the guiding plate, and the fixing pillars are welded with the upper shell.

* * * * *